US010590216B2

(12) United States Patent
Kim et al.

(10) Patent No.: US 10,590,216 B2
(45) Date of Patent: Mar. 17, 2020

(54) VINYL CHLORIDE-BASED RESIN COMPOSITION AND METHOD FOR PRODUCING SAME

(71) Applicant: HANWHA CHEMICAL CORPORATION, Seoul (KR)

(72) Inventors: Ji Won Kim, Yongin-si (KR); Jeong Hwan Ko, Daejeon (KR); Paul Kang, Seoul (KR)

(73) Assignee: HANWHA CHEMICAL CORPORATION, Seoul (KR)

( * ) Notice: Subject to any disclaimer, the term of this patent is extended or adjusted under 35 U.S.C. 154(b) by 151 days.

(21) Appl. No.: 15/781,192

(22) PCT Filed: Nov. 25, 2016

(86) PCT No.: PCT/KR2016/013719
§ 371 (c)(1),
(2) Date: Jun. 4, 2018

(87) PCT Pub. No.: WO2017/099397
PCT Pub. Date: Jun. 15, 2017

(65) Prior Publication Data
US 2018/0346624 A1 Dec. 6, 2018

(30) Foreign Application Priority Data
Dec. 9, 2015 (KR) .................. 10-2015-0174999

(51) Int. Cl.
| | | |
|---|---|---|
| *C08F 214/06* | (2006.01) | |
| *C08F 2/18* | (2006.01) | |
| *C08F 2/22* | (2006.01) | |
| *C08F 220/10* | (2006.01) | |
| *C08F 220/44* | (2006.01) | |
| *C08K 5/58* | (2006.01) | |
| *C08L 1/02* | (2006.01) | |
| *C08L 29/04* | (2006.01) | |
| *C08L 33/02* | (2006.01) | |
| *C08L 71/00* | (2006.01) | |
| *C09D 11/106* | (2014.01) | |
| *C08F 290/06* | (2006.01) | |
| *C08F 220/28* | (2006.01) | |

(52) U.S. Cl.
CPC .............. *C08F 214/06* (2013.01); *C08F 2/18* (2013.01); *C08F 2/22* (2013.01); *C08F 220/10* (2013.01); *C08F 220/44* (2013.01); *C08F 290/062* (2013.01); *C08K 5/58* (2013.01); *C08L 1/02* (2013.01); *C08L 29/04* (2013.01); *C08L 33/02* (2013.01); *C08L 71/00* (2013.01); *C09D 11/106* (2013.01); *C08F 2220/286* (2013.01); *C08F 2500/02* (2013.01); *C08F 2800/20* (2013.01)

(58) Field of Classification Search
CPC .. C08F 214/06; C08F 2/18; C08F 2/22; C08F 220/44; C08F 290/062; C08F 2220/286; C08F 2500/02; C08F 2800/20; C08K 5/58; C08L 1/02; C08L 29/04; C08L 33/02; C08L 71/00; C09D 11/106
USPC .......................................................... 526/192
See application file for complete search history.

(56) References Cited

U.S. PATENT DOCUMENTS

| | | | | |
|---|---|---|---|---|
| 5,731,368 | A | * 3/1998 | Stanley | ................. C08F 214/06 523/340 |
| 2002/0160162 | A1* | 10/2002 | Kawai | ................. B41M 5/5245 428/32.3 |
| 2011/0244240 | A1 | 10/2011 | Kim et al. | |

FOREIGN PATENT DOCUMENTS

| | | |
|---|---|---|
| EP | 0760379 | 3/1997 |
| EP | 0952168 | 10/1999 |
| EP | 2543429 | 1/2013 |
| JP | S57-047313 | 3/1982 |
| JP | H04-039310 | 2/1992 |
| JP | H06-029298 | 4/1994 |
| JP | 09-118728 | 5/1997 |
| JP | H09-118728 | 5/1997 |
| JP | 2010-265365 | 11/2010 |
| JP | 2011-225824 | 11/2011 |
| JP | 2014-043585 | 3/2014 |
| KR | 10-1189384 | 10/2012 |
| KR | 10-2013-0075390 | 7/2013 |
| KR | 10-2014-0115397 | 10/2014 |
| KR | 10-1533408 | 7/2015 |
| KR | 10-1548361 | 8/2015 |
| WO | 1999-023127 | 5/1999 |
| WO | 2011-108580 | 9/2011 |

OTHER PUBLICATIONS

Saeid Rajabzadeh et al., "Preparation of hydrophilic vinyl chloride copolymer hollow fiber membranes with antifouling properties", Applied Surface Science, Elsevier, Amsterdam, NL, vol. 324, Nov. 13, 2014, pp. 718-724, XP029111271.
EPO. Supplementary Search Report of EP 16873262.6. dated Jun. 12, 2019.
KIPO, PCT Search Report & Written Opinion of Application No. PCT/KR2016/013719, dated Feb. 27, 2017.

* cited by examiner

*Primary Examiner* — William K Cheung
(74) *Attorney, Agent, or Firm* — Lex IP Meister, PLLC

(57) ABSTRACT

The present invention relates to a method for producing a vinyl chloride-based resin composition which exhibits good processability due to excellent solubility in a solvent, can implement excellent transparency in products produced, and improves the glossiness of a coating film when used as an ink binder, thereby being capable of being used as a high-quality adhesive and ink binder, and a method for producing the same.

17 Claims, No Drawings

VINYL CHLORIDE-BASED RESIN COMPOSITION AND METHOD FOR PRODUCING SAME

CROSS-REFERENCE TO RELATED APPLICATION(S)

This application is a National Stage of International Application No. PCT/KR2016/013719 filed Nov. 25, 2016 claiming priority to and the benefit of Korean Patent Application No. 10-2015-0174999 filed on Dec. 9, 2015 with the Korean Intellectual Property Office, the full disclosure of which is incorporated herein by reference.

TECHNICAL FIELD

The present invention relates to a method for producing a vinyl chloride-based resin composition, and more particularly, to a vinyl chloride-based resin composition which exhibits good processability due to excellent solubility in a solvent, can implement excellent transparency in products produced and improves the glossiness of a coating film when used as an ink binder, thereby being capable of being used as a high-quality adhesive and ink binder, and a method for producing the same.

BACKGROUND ART

For inks, paints, coatings, adhesives, and the like, binder resins are used in order to improve pigment dispersion and adhesion performance. The polymer material used as the binder resin generally includes an acrylic resin, a vinyl-based resin, a urethane-based resin, and the like.

Among them, the vinyl chloride-based resin can be obtained in the form of fine particles by using a vinyl chloride monomer alone, or mixing a mixture of a vinyl chloride monomer and another comonomer that is copolymerizable therewith, a suspending agent, a buffer, a polymerization initiator, and the like, and then drying a polyvinyl chloride-based resin slurry produced by a suspension polymerization method.

Specifically, a vinyl chloride-based resin can use vinyl chloride, unsaturated carboxylic acid, and vinyl acetate as monomers, and has excellent adhesiveness to a metal material such as iron and aluminum, so it has been widely used in fields of ink binders and adhesives.

However, when a vinyl chloride-based resin containing a carboxylic acid is transported or stored for a long time under a high temperature and high humidity environment, there is a problem that the resin color is changed into pink or red from the original white color. During transportation or storage, if the resin color is changed depending on surrounding environmental conditions, not only will the commercial value of the resin be lost, but also the molecular structure is changed, and thereby several physical properties which are importantly evaluated in the field where resin is used, such as adhesiveness, solubility, transparency, and the like, can be deteriorated.

Thus, studies are needed for a vinyl chloride-based resin which exhibits good processability due to excellent solubility in a solvent, can implement excellent transparency in products produced, and improves the glossiness of a coating film when used as an ink binder, thereby being capable of being used as a high-quality adhesive and ink binder.

DETAILED DESCRIPTION OF THE INVENTION

Technical Problem

The present invention provides a vinyl chloride-based resin composition which exhibits good processability due to excellent solubility in a solvent, can implement excellent transparency in products produced, and improves the glossiness of a coating film when used as an ink binder, thereby being capable of being used as a high-quality adhesive and ink binder, and a method for producing the same.

Technical Solution

The present invention provides a vinyl chloride-based resin composition including a copolymer of a vinyl chloride-based monomer, an ethylenic unsaturated monomer, and a polyethylene glycol-based monomer containing a (meth)acrylate group in a molecule.

The present invention also provides a method for producing a vinyl chloride-based resin composition, the method including polymerizing a monomer mixture including a vinyl chloride-based monomer, an ethylenic unsaturated monomer, and a polyethylene glycol-based monomer containing a (meth)acrylate group in a molecule in the presence of an initiator.

Advantageous Effects

The vinyl chloride-based resin composition according to the present invention exhibits good processability due to excellent solubility in a solvent, can implement excellent transparency in products produced, and improves the glossiness of a coating film when used as an ink binder, thereby being capable of being used as a high-quality adhesive and ink binder.

DETAILED DESCRIPTION OF THE EMBODIMENTS

The vinyl chloride-based resin composition of the present invention includes a copolymer of a vinyl chloride-based monomer, an ethylenic unsaturated monomer, and a polyethylene glycol-based monomer containing a (meth)acrylate group in a molecule.

In addition, the method for producing a vinyl chloride-based resin composition according to the present invention includes polymerizing a monomer mixture including a vinyl chloride-based monomer, an ethylenic unsaturated monomer, and a polyethylene glycol-based monomer containing a (meth)acrylate group in a molecule in the presence of an initiator.

The terminology used herein is only for the purpose of describing exemplary embodiments and is not intended to limit the present invention. Further, singular expressions "a," "an," and "the" as used herein may include a plural expression unless the context clearly indicates otherwise. In addition, it should be understood that the meaning of the terms "comprising," "including," "having," and the like are intended to specify the presence of stated features, numbers, steps, components, or combinations thereof, and does not exclude existence or addition of one or more other features, numbers, components, or combinations thereof.

The present invention can be variously modified and take various forms, and thus specific embodiments are illustrated and described in detail below. It should be understood, however, that the invention is not intended to be limited to any particular disclosure form, but includes all modifications, equivalents, and alternatives falling within the spirit and scope of the invention.

Hereinafter, the present invention will be described in more detail.

The vinyl chloride-based resin composition according to one aspect of the present invention includes a copolymer of a vinyl chloride-based monomer, an ethylenic unsaturated monomer, and a polyethylene glycol-based monomer containing a (meth)acrylate group in a molecule.

The ethylenic unsaturated monomer that can be used includes one or more monomers selected from the group consisting of: a vinyl ester-based monomer including an ethylene vinyl acetate monomer and a vinyl propionate monomer; an olefinic monomer including ethylene, propylene, isobutyl vinyl ether, and a halogenated olefin; a (meth)acrylic acid alkyl ester-based monomer including hydroxymethyl acrylate, hydroxyethyl acrylate, and hydroxypropyl acrylate; a maleic anhydride monomer; an acrylonitrile monomer; a styrene monomer; and a halogenated polyvinylidene monomer, but the present invention is not necessarily limited thereto. However, it may be more preferable to use monomers having solubility in water among them.

The ethylenic unsaturated monomer may be added in an amount of about 10 to about 100 parts by weight, preferably about 20 to about 70 parts by weight, based on 100 parts by weight of the vinyl chloride-based monomer. When the ethylenic unsaturated monomer is used within the above amount range, the amount of the unreacted monomer remaining in the resin after completion of the polymerization can be reduced, whereby the vinyl chloride-based resin composition finally produced can minimize denaturation due to the external environment.

In general, the vinyl chloride-based resin composition prepared by using the vinyl chloride-based monomer and the ethylenic unsaturated monomer may be easily degenerated due to external environmental conditions such as heat, humidity, etc. This is not only because the ethylenic unsaturated monomer compound binds to the vinyl chloride-based monomer to form a thermally fragile molecular structure, but also the unreacted ethylenic unsaturated monomer may remain in the resin.

Thus, the vinyl chloride-based resin composition of the present invention includes a copolymer of a vinyl chloride-based monomer, an ethylenic unsaturated monomer, and a polyethylene glycol-based monomer containing a (meth)acrylate group in a molecule.

According to an embodiment of the present invention, the polyethylene glycol-based monomer may be represented by the following Chemical Formula 1.

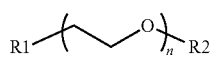

[Chemical Formula 1]

In Chemical Formula 1,
n is an integer from 2 to 100, and
R1 and R2 are the same as or different from each other and are each independently hydrogen, a hydrocarbyl group having 1 to 10 carbon atoms, or a (meth)acrylate terminal group, wherein at least one of R1 and R2 is a (meth)acrylate terminal group.

As can be seen from the above structural formula, the compound represented by Chemical Formula 1 has one or more reactive functional groups in a molecule and thus can be polymerized with the vinyl chloride-based monomer, and depending on the number of ethylene glycol repeat units, i.e., the value of n, the molecular weight can be controlled. The range of n may preferably be about 2 to 20.

These polyethylene glycol-based monomers can improve compatibility with a pigment, can accelerate the curing rate in the polymerization reaction, and can impart hydrophilicity to the vinyl chloride-based resin to be produced.

Specifically, the polyethylene glycol-based monomer may have a weight average molecular weight from about 200 g/mol to about 5000 g/mol, and preferably from about 500 g/mol to 1000 g/mol. The polyethylene glycol-based monomer having a weight average molecular weight value within the above range is excellent in compatibility with vinyl chloride-based monomers, and improves the plasticity, dispersibility, and polymerizability of the monomer mixture in the polymerization process. Thereby, the transparency and glossiness of the vinyl chloride-based resin composition to be produced can be improved.

Specific examples of the polyethylene glycol-based monomer include methoxypolyethylene glycol acrylate, methoxypolyethylene glycol methacrylate, ethoxy polyethylene glycol acrylate, ethoxy polyethylene glycol methacrylate, aryloxy polyethylene glycol acrylate, aryloxy polyethylene glycol methacrylate, polyethylene glycol diacrylate, polyethylene glycol dimethacrylate, and the like, but the present invention is not necessarily limited thereto.

Further, the polyethylene glycol-based monomer may be included in an amount of about 0.5 parts by weight to about 5 parts by weight, and preferably about 0.1 parts by weight to about 2 parts by weight, based on 100 parts by weight of the copolymer.

According to another embodiment of the present invention, the vinyl chloride-based resin composition of the present invention may further include an organotin compound represented by the following Chemical Formula 2.

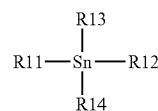

[Chemical Formula 2]

In Chemical Formula 2,
Sn is tin, and
R11 to R14 are the same as or different from each other and are each independently hydrogen, a mercapto group (—SH), a linear or branched alkyl group having 1 to 15 carbon atoms, or a linear or branched alkylsulfanyl group having 1 to 15 carbon atoms.

More specifically, tetramethyl tin, tetrabutyl tin, monomethyl tin mercaptide, octyl tin mercaptide, dioctyl tin mercaptide, and the like are preferred, but the present invention is not limited thereto.

The organotin compound can act as a polymerization retarder in the polymerization reaction, and can improve transparency and glossiness of the vinyl chloride-based resin to be produced.

Further, the organotin compound may be included in an amount of about 0.1 parts by weight to about 5 parts by weight, and preferably about 0.1 parts by weight to about 2 parts by weight, based on 100 parts by weight of the copolymer.

If the content is out of the above range, due to a change in the content of molecules acting as the polymerization retarder, the polymerization reaction time may be delayed or the productivity may be affected, and it may be difficult to properly control the polymerization degree of the vinyl chloride-based resin to be produced.

The vinyl chloride-based resin composition may further include a suspending agent, an emulsifier, a dispersant, and the like, which are added as necessary in the polymerization step.

Meanwhile, the above-described vinyl chloride-based resin composition can be produced by a method including polymerizing a monomer mixture including a vinyl chloride-based monomer, an ethylenic unsaturated monomer, and a polyethylene glycol-based monomer containing a (meth) acrylate group in a molecule in the presence of an initiator.

In this case, the polymerization may preferably be suspension polymerization or emulsion polymerization.

The method for producing the vinyl chloride-based resin according to one embodiment will be described in detail as follows.

The vinyl chloride-based resin can be produced by mixing an organotin compound, a suspending agent, an oil-soluble initiator, and a dispersant to produce a slurry by a suspension polymerization method, removing unreacted monomers from the slurry, and then dehydrating and drying the slurry from which the unreacted monomer has been removed. In this case, the additive may include an emulsifier, a water-soluble initiator, or a combination thereof.

According to one embodiment, when polymerization is carried out by a suspension polymerization method using the above-mentioned monomers, an additive containing a suspending agent, an emulsifier, a dispersant, a water-soluble initiator, or a combination thereof is further added and used, and thereby the reaction of the ethylenic unsaturated monomer can be induced to increase a conversion rate, and the emulsifier or the water-soluble initiator and the like may be positioned on the surface of the polymerized vinyl chloride-based resin, thereby blocking heat transfer to the inside of the resin and minimizing denaturation of the resin.

To more specifically explain the mechanism, the ethylenic unsaturated monomer has relatively higher solubility in water compared to the vinyl chloride, so the unsaturated carboxylic acid-based compound is highly likely to be distributed at the outside of a vinyl chloride droplet or in the aqueous phase rather than at the inside of the vinyl chloride droplet in the suspension polymerization in which the oil-soluble initiator is used. The emulsifier may include an anionic emulsifier, a nonionic emulsifier, or a combination thereof. Since these emulsifiers have hydrophilic properties, it may capture the ethylenic unsaturated carboxylic acid-based monomer distributed at the outside of the vinyl chloride droplet and the aqueous phase, inducing the same to participate in polymerization, so that a reaction conversion rate of the compound can be increased. In addition, the water-soluble initiator may likewise enhance the reaction conversion rate of the unsaturated carboxylic acid-based compound. Further, the emulsifier or the water-soluble initiator induces formation of particle morphology distributed on the surface of the polymerized vinyl chloride-based resin, so as to minimize a change of a molecular structure by heat.

At this time, the polyethylene glycol-based monomer may be simultaneously added while mixing with other monomers, or may be individually added at a stage where the degree of polymerization of the monomer mixture other than the polyethylene glycol-based monomer is about 60% to about 90%.

When the polyethylene glycol-based monomer is simultaneously added with other monomers, most of the molecules react at the initial stage of the polymerization. However, when individually added at the stage where the degree of polymerization of the other monomer mixture is within the above range, it will be distributed throughout the vinyl chloride based resin produced, so that the overall transparency and glossiness can be evenly improved.

In the suspension polymerization method, polymerization water at room temperature or at a high temperature may be used as a reaction medium. In addition, the monomer and the dispersant are uniformly dispersed, and the oil-soluble initiator is decomposed at a certain temperature, for example at 50° C. to 70° C., and thereby the polymerization can be carried out by a chain reaction with the vinyl chloride monomer. Also, when the reaction conversion rate of the monomer mixture reaches a certain point, the polymerization can be completed.

When the emulsifier is used as the additive, the emulsifier may include an anionic emulsifier, a nonionic emulsifier, or a combination thereof.

The anionic emulsifier may include an alkali metal salt or an ammonium salt of C6-C20 fatty acid, an alkali metal salt or an ammonium salt of C6-C20 alkylsulfonic acid, an alkali metal salt or an ammonium salt of C6-C20 alkylbenzenesulfonic acid, an alkali metal salt or an ammonium salt of C6-C20 alkylsulfate, an alkali metal salt or an ammonium salt of C6-C20 alkyldisulfonic acid diphenyl oxide, or a combination thereof. The nonionic emulsifier may include a nonionic emulsifier including C6-C20 alcohol, polyethylene oxide, polyoxyethylene alkyl phenyl ether, polyoxyethylene alkyl ether, sorbitan monolaurate, polyvinyl alcohol, polyethylene glycol, or a combination thereof, but the present invention is not necessarily limited thereto.

The emulsifier may be used by mixing the anionic emulsifier and the nonionic emulsifier. In this case, the anionic emulsifier and the nonionic emulsifier can be mixed in a weight ratio of about 1:0.5 to about 1:200, and specifically, in a weight ratio of about 1:2 to about 1:50. When the anionic emulsifier and the nonionic emulsifier are mixed within the weight ratio range, the stability of the slurry can be ensured, the reaction conversion rate of the ethylenic unsaturated compound can be maximally increased, and the heat transfer from the surface of the polymerized vinyl chloride-based resin to the inside of the resin can be maximally prevented.

The emulsifier may be mixed in an amount of about 0.005 to about 1.0 part by weight, and preferably about 0.01 to about 0.1 parts by weight, based on 100 parts by weight of the monomer mixture. When the emulsifier is used within the above amount range, the reaction conversion rate of the ethylenic unsaturated compound can be maximally increased, and the heat transfer from the surface of the polymerized vinyl chloride-based resin to the inside of the resin is maximally prevented, so as to minimize the denaturation of the vinyl chloride-based resin.

The oil-soluble initiator used during the suspension polymerization may include t-butyl peroxy neodecanoate, diisopropyl peroxy dicarbonate, methyl ethyl ketone peroxide, di-2-ethylhexyl peroxydicarbonate, di-3-methoxybutyl peroxy dicarbonate, t-butyl peroxy pivalate, t-amylperoxy pivalate, t-hexylperoxy pivalate, or a combination thereof.

The oil-soluble initiator may be used in an amount of about 0.01 to about 1 part by weight, and specifically about 0.02 to about 0.1 parts by weight, based on 100 parts by weight of the monomer mixture. When the oil-soluble initiator is used within the above-mentioned amount range, the polymerization reactivity is excellent and the polymerization reaction heat is easily controlled.

The water-soluble initiator may include potassium persulfate, ammonium persulfate, sodium persulfate, sodium bisulfate, sodium hydrosulfite, or a combination thereof.

When the oil-soluble initiator and the water-soluble initiator are used together, each may be used by mixing them in a weight ratio of about 95:5 to about 5:95, preferably about 90:10 to about 10:90. When the oil-soluble initiator and the water-soluble initiator are mixed within the above-mentioned ratio range, productivity can be improved by appropriately controlling the polymerization time.

When both the emulsifier and the water-soluble initiator are used as the additive, the emulsifier and the water-soluble initiator can be used by mixing them in a weight ratio of about 1:50 to about 50:1, preferably about 1:20 to about 20:1, more preferably in a weight ratio of about 1:1 to about 20:1, or in a weight ratio of about 2:1 to about 15:1. When the emulsifier and the water-soluble initiator are mixed within the above-mentioned ratio range, it is possible to obtain a resin having excellent glossiness while minimizing the deterioration in adhesiveness due to use of an emulsifier.

The dispersant used during the suspension polymerization may include polyvinyl alcohol, cellulose, gelatin, an acrylic acid polymer, a methacrylic acid polymer, an itaconic acid polymer, a fumaric acid polymer, a maleic acid polymer, a succinic acid polymer, or a combination thereof, which have a degree of saponification of greater than or equal to 40%.

The dispersant may be used in an amount of about 0.03 to about 5 parts by weight, and more specifically, about 0.05 to about 2.5 parts by weight, based on 100 parts by weight of the monomer mixture. When the dispersant is used within the above-mentioned amount range, it can produce vinyl chloride resin particles with a uniform size.

According to another aspect of the present invention, a coating ink including the vinyl chloride-based resin composition is provided.

The coating ink may be prepared by a method generally used in the technical field to which the present invention pertains, except that it is prepared by incorporating the vinyl chloride-based resin composition of the present invention. For example, the coating ink may be prepared by a method of mixing the vinyl chloride-based resin composition with a solvent, various pigments, and beads, and then dispersing the resultant mixture with a shaker or the like.

Hereinafter, the action and effect of the present invention will be described in more detail by way of concrete examples. However, these examples are provided for the purpose of illustration only, and are not intended to limit the scope of the invention in any way.

EXAMPLES

Preparation of Vinyl Chloride-Based Resin Composition

Example 1

After removing oxygen from a 280 L reactor using a vacuum pump, 30 kg of a vinyl chloride monomer, 17 kg of a vinyl acetate monomer, 0.84 kg of Methoxy PEG 600 methacrylate as a polyethylene glycol-based monomer, 0.17 kg of dioctyl tin mercaptide as an organotin compound, 3.0 kg of a 3% aqueous solution of a cellulose-based suspension, and 56 g of an initiator azobisisobutyronitrile were mixed in 130 L of deionized water to initiate polymerization.

The reactor temperature was raised to 68° C., and 30 kg of a vinyl chloride monomer and 8.4 kg of hydroxypropyl acrylate were further added over 3 hours and then allowed to react for a total of 6 hours. When the reactor pressure was decreased by 1.0 kg/cm$^2$ compared with the initial polymerization stage, polymerization was stopped, and unreacted monomers were recovered to complete the polymerization. The polymerized slurry was dehydrated and dried to obtain a vinyl chloride-based resin composition particle having an average particle size of 190 μm.

Example 2

A polymerization reaction was carried out in the same manner as in Example 1, except that vinyl acetate and a hydroxypropyl acrylate monomer of Example 1 were not used, 21 kg of isobutyl vinyl ether was added at the initial reaction stage, and an organotin compound was used (average size of the obtained particles: 195 μm).

Example 3

A polymerization reaction was carried out in the same manner as in Example 2, except that 0.84 kg of dioctyl tin mercaptide was further added as the organotin compound in Example 2, thereby obtaining a vinyl chloride-based resin composition (average size of the obtained particles: 190 μm).

Example 4

A polymerization reaction was carried out in the same manner as in Example 2, except that 0.17 kg of dioctyl tin mercaptide was further added as the organotin compound in Example 2, thereby obtaining a vinyl chloride-based resin composition (average size of the obtained particles: 205 μm).

Comparative Example 1

A polymerization reaction was carried out in the same manner as in Example 1, except that the polyethylene glycol-based monomer Methoxy PEG 600 methacrylate and the organotin compound of Example 1 were not added, thereby obtaining a vinyl chloride-based resin composition (average size of the obtained particles: 180 μm).

Comparative Example 2

A polymerization reaction was carried out in the same manner as in Example 2, except that the polyethylene glycol-based monomer Methoxy PEG 600 methacrylate of Example 2 was not added, thereby obtaining a vinyl chloride-based resin composition (average size of the obtained particles: 200 μm).

Preparation of Coating Ink 20 parts by weight of the respective vinyl chloride-based resin compositions obtained in the examples and comparative examples were mixed with 80 parts by weight of ethyl acetate (Comparative Example 1 and Examples 1 to 3) or methyl ethyl ketone (Comparative Example 2 and Examples 4 to 6), and stirred at 50° C. for 90 minutes to prepare a mixed solution.

The transparency of the mixed solution thus prepared was measured using an ultraviolet spectrophotometer (600 nm).

50 g each of the above mixed solutions, 10 g of a pigment (carbon black), and 40 g of a solvent (Comparative Example 1 and Example 1: ethyl acetate, Comparative Example 2 and Examples 2 to 4: methyl ethyl ketone), and 35 g of beads (product name: Alumina Bead, manufacturer: Samhwa Ceramic) were mixed and dispersed with an ink shaker for 1 hours to prepare a coating ink.

Further, after applying the prepared coating ink to a PET film and drying it, the glossiness was measured using a gloss meter (60°). The glossiness was repeatedly measured five times and then expressed as an average value.

The composition and physical properties of the examples and comparative examples are summarized in Table 1 below.

TABLE 1

|  | Polyethylene glycol-based monomer (parts by weight relative to monomer) | Organotin compound (parts by weight relative to monomer) | Solution transparency (%) | Glossiness (GU) |
|---|---|---|---|---|
| Comparative Example 1 | 0 | 0 | 78 | 8 |
| Comparative Example 2 | 0 | 0 | 71 | 12 |
| Example 1 | 0.97 | 0.20 | 94 | 21 |
| Example 2 | 1.03 | 0 | 81 | 34 |
| Example 3 | 1.03 | 1.03 | 88 | 70 |
| Example 4 | 1.03 | 0.20 | 84 | 34 |

Referring to Table 1, it can be confirmed that, in the case of the examples of the present invention, the solution contains a polyethylene glycol-based monomer and optionally further contains an organotin compound, and thus has very high glossiness when dissolved in a solvent. Specifically, it can be confirmed that the glossiness is greater than or equal to about 80%, or about 80% to 95%.

In addition, it can be confirmed that, when produced as a coating ink, the ink has an excellent value of glossiness, and has a very high value of glossiness (minimum 20 GU) as compared to the comparative examples (about 10 GU).

Therefore, the vinyl chloride-based resin composition according to the examples of the present invention can realize a coating ink having excellent physical properties.

The invention claimed is:

1. A vinyl chloride-based resin composition comprising a copolymer of a vinyl chloride-based monomer, an ethylenic unsaturated monomer, and a polyethylene glycol-based monomer containing a (meth)acrylate group in a molecule.

2. The vinyl chloride-based resin composition of claim 1, wherein the ethylenic unsaturated monomer includes one or more monomers selected from the group consisting of: a vinyl ester-based monomer; an olefinic monomer; a (meth)acrylic acid alkyl ester-based monomer; a maleic anhydride monomer; an acrylonitrile monomer; a styrene-based monomer; and a halogenated polyvinylidene monomer.

3. The vinyl chloride-based resin composition of claim 1, wherein the polyethylene glycol-based monomer is represented by the following Chemical Formula 1:

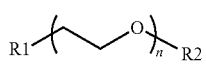

[Chemical Formula 1]

wherein, in Chemical Formula 1,
n is an integer from 2 to 100, and
R1 and R2 are the same as or different from each other and are each independently hydrogen, a hydrocarbyl group having 1 to 10 carbon atoms, or a (meth)acrylate terminal group,
wherein at least one of R1 and R2 is a (meth)acrylate terminal group.

4. The vinyl chloride-based resin composition of claim 1, wherein the polyethylene glycol-based monomer has a weight average molecular weight of 200 g/mol to 5000 g/mol.

5. The vinyl chloride-based resin composition of claim 1, wherein the polyethylene glycol-based monomer is included in an amount of 0.5 parts by weight to 5 parts by weight, based on 100 parts by weight of the copolymer.

6. The vinyl chloride-based resin composition of claim 1, further comprising an organotin compound represented by the following Chemical Formula 2:

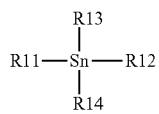

[Chemical Formula 2]

wherein, in Chemical Formula 2,
Sn is tin, and
R11 to R14 are the same as or different from each other and are each independently hydrogen, a mercapto group (—SH), a linear or branched alkyl group having 1 to 15 carbon atoms, or a linear or branched alkylsulfanyl group having 1 to 15 carbon atoms.

7. The vinyl chloride-based resin composition of claim 6, wherein the organotin compound is included in an amount of 0.1 parts by weight to 5 parts by weight, based on 100 parts by weight of the copolymer.

8. The vinyl chloride-based resin composition of claim 1, further comprising one or more selected from the group consisting of a suspending agent, an emulsifier, and a dispersant.

9. A method for producing a vinyl chloride-based resin composition, the method comprising polymerizing a monomer mixture including a vinyl chloride-based monomer, an ethylenic unsaturated monomer, and a polyethylene glycol-based monomer containing a (meth)acrylate group in a molecule in the presence of an initiator.

10. The method for producing a vinyl chloride-based resin composition of claim 9, wherein the polymerization is suspension polymerization or emulsion polymerization.

11. The method for producing a vinyl chloride-based resin composition of claim 9, wherein the polyethylene glycol-based monomer is simultaneously added while mixing with other monomers, or is individually added at a stage where the degree of polymerization of the monomer mixture other than the polyethylene glycol-based monomer is 60% to 90%.

12. The method for producing a vinyl chloride-based resin composition of claim 9, wherein the ethylenic unsaturated monomer includes one or more monomers selected from the group consisting of: a vinyl ester-based monomer; an olefinic monomer; a (meth)acrylic acid alkyl ester-based monomer; a maleic anhydride monomer; an acrylonitrile monomer; a styrene-based monomer; and a halogenated polyvinylidene monomer.

13. The method for producing a vinyl chloride-based resin composition of claim 9, wherein the polyethylene glycol-based monomer is represented by the following Chemical Formula 1:

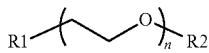

[Chemical Formula 1]

wherein, in Chemical Formula 1, n is an integer from 2 to 100, and

R1 and R2 are the same as or different from each other and are each independently hydrogen, a hydrocarbyl group having 1 to 10 carbon atoms, or a (meth)acrylate terminal group, wherein at least one of R1 and R2 is a (meth)acrylate terminal group.

14. The method for producing a vinyl chloride-based resin composition of claim 9, wherein the polymerization is carried out by further comprising an organotin compound represented by the following Chemical Formula 2:

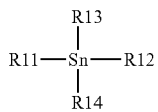

[Chemical Formula 2]

wherein, in Chemical Formula 2,

Sn is tin, and

R11 to R14 are the same as or different from each other, and are each independently hydrogen, a mercapto group (—SH), a linear or branched alkyl group having 1 to 15 carbon atoms, or a linear or branched alkylsulfanyl group having 1 to 15 carbon atoms.

15. The method for producing a vinyl chloride-based resin composition of claim 9, wherein the polymerization is carried out in the presence of one or more additives selected from the group consisting of a suspending agent, an emulsifier, and a dispersant.

16. The method for producing a vinyl chloride-based resin composition of claim 15, wherein the dispersant includes polyvinyl alcohol, cellulose, gelatin, an acrylic acid polymer, a methacrylic acid polymer, an itaconic acid polymer, a fumaric acid polymer, a maleic acid polymer, a succinic acid polymer, or a combination thereof, which have a degree of saponification of greater than or equal to 40%.

17. A coating ink comprising the vinyl chloride-based resin composition of claim 1.

\* \* \* \* \*